UNITED STATES PATENT OFFICE.

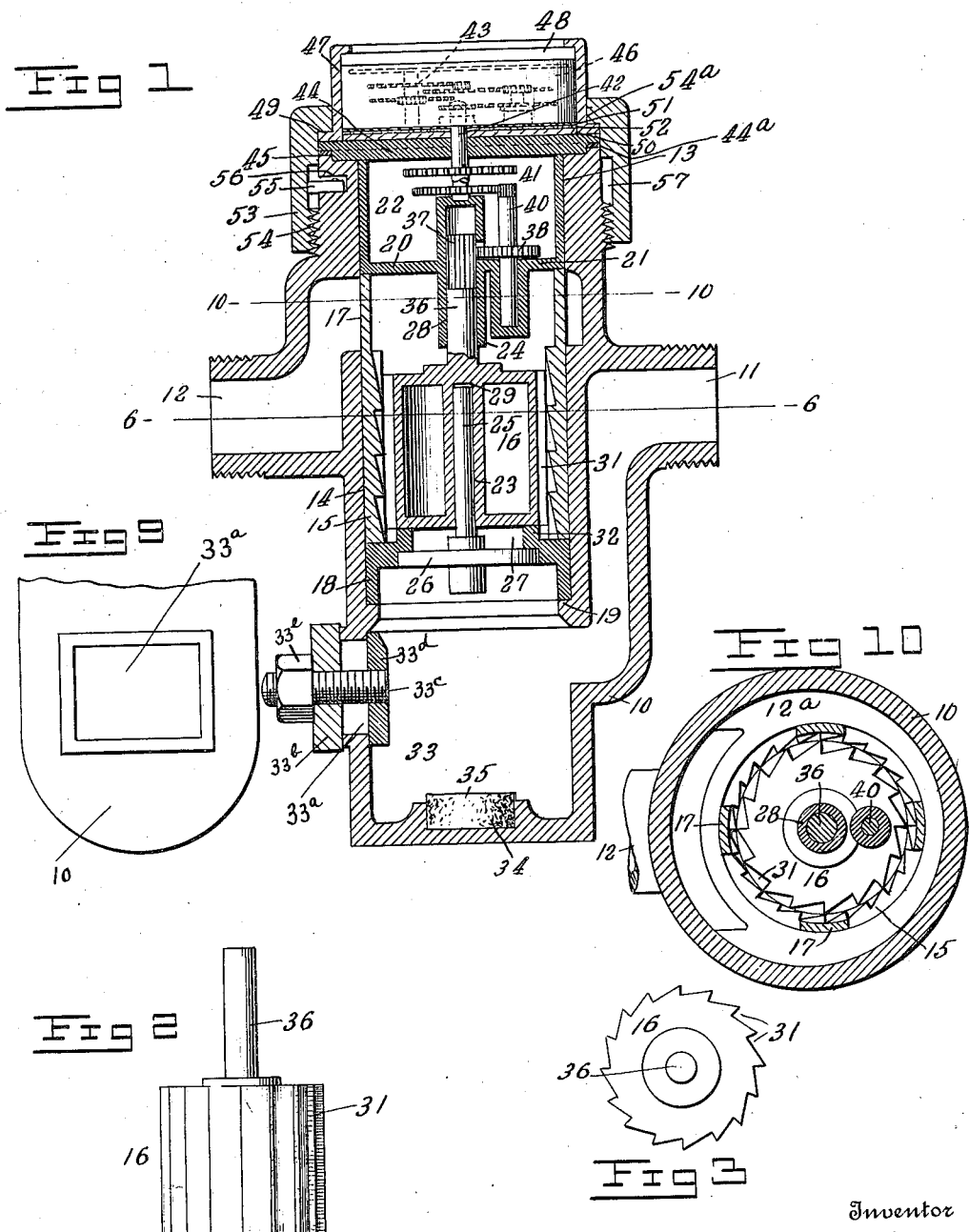

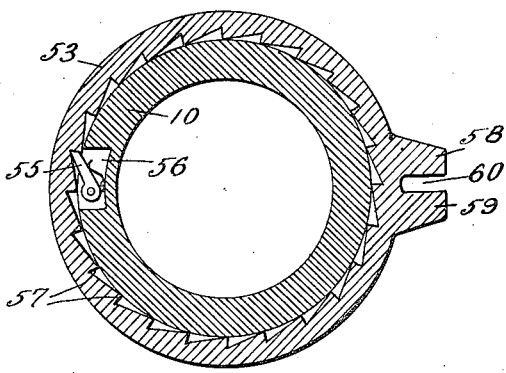
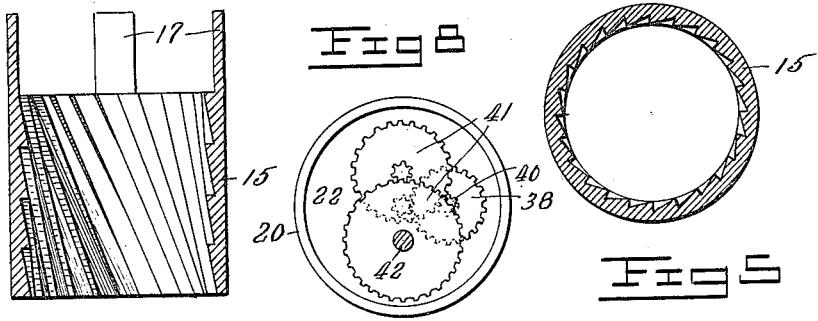
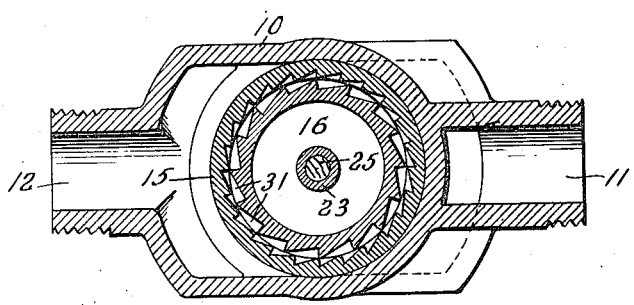

THOMAS CHARLTON, OF CHICAGO, ILLINOIS.

FLUID-METER.

1,016,934.      Specification of Letters Patent.      Patented Feb. 13, 1912.

Application filed December 21, 1910. Serial No. 598,614.

*To all whom it may concern:*

Be it known that I, THOMAS CHARLTON, a citizen of the United States, residing at Chicago, in the county of Cook and State of Illinois, have invented new and useful Improvements in Fluid-Meters, of which the following is a specification.

My invention relates to fluid meters of the rotary type particularly adapted to the measuring of water. While intended for the particular use stated, however, it will be apparent upon an understanding of my invention that it may be used in other connections and in other situations.

I have aimed by my invention to produce an accurate meter proof against fraudulent manipulation and which at the same time is proof against disturbing, operating and weather conditions and yet is still a meter simple, durable and cheap in construction.

I show in the accompanying drawings one embodiment of my invention.

Of the drawings:—Figure 1 is a central vertical section of the meter of my invention. Fig. 2 is an elevation of the rotary element of this meter. Fig. 3 is a plan view of the same. Fig. 4 is a vertical section of the complemental stationary element of the meter. Fig. 5 is a top plan view of the element shown in Fig. 4. Fig. 6 is a central transverse section through the inlet and outlet openings of the meter on line 6—6 of Fig. 1. Fig. 7 is a detail sectional view illustrating the casing of the meter and the sealing means combined therewith to prevent tampering with the registering mechanism. Fig. 8 is a detail plan view of the intermediate train of gearing which transmits movement from the rotor to the registering mechanism, the shaft of the primary wheel of this train of gearing being shown in section. Fig. 9 is a side view of the bottom of the meter showing the rectangular shape of the opening therein. Fig. 10 is a section on the line 10—10 of Fig. 1 showing discharge passage ways of the meter.

Referring to the drawings the main body casing of the meter is designated 10. This casing, as shown, is cast in one piece. It is provided with an inlet opening 11, an outlet opening 12, and an additional opening 13 of somewhat larger size in this case, through which the parts of the meter may be inserted and removed. Between the inlet opening and the outlet opening 12 is a chamber 14 in which the measuring device is located. This measuring device consists of fixed and rotary members 15 and 16, respectively, preferably cylindrical in shape as is also the chamber in which they are placed.

The fixed member 15 is of the form shown in Figs. 4 and 5. Its main body fits closely within the chamber 14, and the interior surface of the main body is spirally fluted, the flutes being open ended, as clearly shown in Figs. 4, 5 and 6. These flutes have all the same general angle with respect to the fixed element 15 and extend from its top to its bottom. At the top the member 15 is provided with several upwardly projecting arms 17. The casing wall is spaced from these arms and an eccentric chamber thereby formed, the largest part of which is toward the outlet opening (see Fig. 10). The bottom of the fixed member rests on a removable seat member 18 fitting closely within the bottom of the chamber 14 and against the shoulder 19 at the end of that chamber. The arms 17 project up beyond the outlet opening 12 and are engaged by an upper bearing member 20 seated in the upper part of the casing as shown. As clearly appears, in Fig. 8, this bearing member is cylindrical in shape and its bottom end is provided with a head 21 (Fig. 1) which cuts off from the chamber 14 of the measuring device a chamber 22 within the member 20.

The rotary member of the meter, as shown in Figs. 1, 2 and 3, is cylindrical in shape in this embodiment. It is journaled by the upper and lower bearings 23 and 24. The lower bearing 23 is constituted by a bearing post 25 projecting upwardly from the center of a spider 26 seated centrally of a central opening 27 in the seat member 18. The rotor is centrally bored at 29 to fit this post. The upper bearing is constituted by a central journal 28 formed in the bearing member 20 and the pintle 36 of the rotor. The exterior surface of the rotor is provided with straight open ended flutes 31 and the diameter of the rotor is approximately equal to the interior diameter of the stationary member 15, the difference being enough to insure good clearance.

The lower end of the rotor is finished to adapt the rotor to constitute a valve disk. A valve seat 32 is formed surrounding the central opening 27 in the seat member 18, and the bottom of the rotor is adapted, under certain conditions, to rest upon this seat and close the opening 27. The rotor is made hollow, its weight being made substantially equal to the weight of the water it displaces, so that it is substantially floating and may be moved up or down to open or close the opening 27. I shall term this rotor a floating rotor and the valve connected with it a floating check valve.

It will be noted that the rotor is hollow and water tight, the inner portions of its body being cored. This serves a double function. First, it gives to the rotor the proper weight as compared with the water displaced so that it may be floated, as above defined, and second, it renders the rotor laterally compressible. Therefore, should the water within the meter freeze, the meter will not be damaged by expansion which takes place when the water freezes.

Below the measuring device on the inlet side of the meter is a trap chamber 33, positioned as is common, to trap a portion of the fluid flowing through the meter and to receive all of the foreign matter, which by movement of the fluid or by its weight, is carried to the bottom of the chamber. A clean-out opening 33ª is provided for the chamber 33, and preferably is closed in the manner shown in the drawings by means of a cover plate 33ᵇ held in place by means of a screw bolt 33ᶜ which engages with an interior element 33ᵈ. A nut 33ᵉ is threaded upon this bolt in order to draw the cover element 33ᵇ and the element 33ᵈ into close contact with the opposite walls of the casing about the opening and thus close the opening. When the closure is of the type described the clean-out opening is, as shown in Fig. 9, preferably elongated so that the element 33ᵈ by being properly turned may pass out through the opening. Positioned in the pocket 34 formed in the bottom of the chamber 33 is a body 35 of compressible material, such as rubber adapted to be compressed upon freezing of the fluid in the trap chamber and to prevent thereby bursting of the walls of the chamber.

The pintle 36 of the rotor is provided at its upper end with a gear 37 within the journal 28. This gear meshes with a pinion 38 on the shaft 40 of an intermediate train of gearing 41 which transmits movement of the rotor through the shaft 42 to the registering train of dials 43. The intermediate train of gearing 41 instead of being in the chamber of the measuring device in the path of the fluid through the meter is placed in the chamber 22 beyond the wall formed by the head 21 of the bearing member 20. Thus the gears are not subject to the wearing action of the fluid, and dirt and grit is prevented from engaging them.

A wall 44 in the shape of a closing disk seated in the body casing across the top 13 and shouldered as at 45 separates the chamber 22 from a chamber 46 containing the registering dials 43, and formed by the dial casing 47 provided with the usual glass 48 at its top and a lower laterally projecting flange 49 at its bottom substantially of the diameter of the wall 44. Adjacent the wall 44 and fitting closely around the shaft 42 within the chamber 46 are two linings adapted to prevent sweating and the entrance of moisture from the chamber 22 to the chamber 46. The first 51 is of sheet rubber, and the second 52 is of felt. The rubber is moisture proof, the felt is a moisture arrester. By this means all clouding of the glass of the registering dial under severe weather conditions is prevented.

All of the parts of the meter are inserted and may be removed through the opening 13. All of the parts of the meter are confined within and held in their relative operative positions by means of a single securing and sealing device, which device in addition to securing the parts in the meter firmly, is also adapted to form a seal which absolutely prevents tampering with the meter by an unauthorized person without certain detection of the same. This clamping member is a collar 53 threaded to the casing at some distance below its top by bastard threads 54 of such pitch and of such form as to defy ready duplication in the commercial shops, which shops are equipped only with standard and the usual thread cutting tools. The upper end of this collar is internally flanged to form a shoulder 54ª, which is adapted to clamp tightly down on the flange 49 and hold the parts in place. The flange 49 bears upon the wall 44, the wall 44 upon the bearing member 20, the member 20 upon the arms 17 of the member 14, the member 14 upon the seat member 18 and the seat member 18 upon the shoulder 19 formed integrally with the body casing. Between the wall 44 and the top of the casing is a lead gasket 44ª which makes a fluid tight joint between the wall and the casing and constitutes a fluid seal of the meter. Between the sealing member 53 and the top of the casing 10 and preferably above the screw threads is an inclosed and unbreakable sealing mechanism. This mechanism comprises a pawl 55 in a recess 56 in the top of the casing, and co-operating ratchet teeth 57 formed on the interior of the collar 53. The pawl is so disposed that the sealing member 53 may be readily screwed up tightly in a right handed direction without interference from the pawl, but the moment an attempt is made to unscrew the sealing member the parts are locked together and the collar can only be removed by breaking it. To assist in this breaking lugs 58 and 59 of goodly proportions are placed adjacent each other and adapted for insertion of a tool in the space 60 between them, whereby the collar may be broken at this point. The collar must be broken before it can be removed and before any of the parts of the meter can be tampered with, and once broken, by reason of the odd nature of its threads, it can only be duplicated by a very great amount of time and labor expended. The registering train can not be tampered with without certain detection, the glass, as shown, being seated within the casing member 47.

The operation of this meter of my invention should be apparent.

Upon the flow of water through the inlet opening 11, the floating check valve constituted by the bottom of the rotor 15 is lifted from its seat 32 and water flows along the channels in the fixed member 14 at an angle to the channels in the rotary member 15. The member 15 rotates at a speed proportional to the quantity of water flowing therethrough. This water finds its way out of the opening 12, through chamber 12ª surrounding the arm 17, passing from chamber 14 radially (see Fig. 10) and thus minimizing wear on pintle 36 and bearing 28.

If at any time attempt is made to reverse the meter connections and so drive the measuring devices backward and decrease the maximum registration, the rotor will not rise with the water flowing but will be pressed to the seat 32, and prevent the flow of water through the meter.

By virtue of the use of the one piece casing and the use of a single clamping, closing and sealing member, the meter is made at once simple, strong, and cheap. The closing member 53 holds all the parts in relative operating positions.

While I have described the best form of my invention now known to me, it will be obvious that my invention may be given many other forms by those skilled in the art without departing from its generic spirit. I therefore desire to cover in the annexed claims all such modifications.

Having thus described the invention what is claimed as new is:—

1. A meter comprising a check valve having a weight approximately equal to the weight of the water it displaces and arranged in the fluid passage way within the meter to prevent the flow of fluid through the meter in a direction opposite to normal.

2. A rotary fluid meter comprising a chambered casing, an open ended rotor chamber in said casing, a rotor in said chamber and of the shape of the chamber, the walls of said chamber being spirally fluted with open ended flutes, and the outer surface of said rotor being provided with open ended flutes at an angle to the flutes of the chamber walls, and registering devices geared to the rotor, said meter having an inlet opening at one end of the rotor chamber, and an outlet opening at the other.

3. A rotary fluid meter comprising a chambered casing, a rotor chamber in said casing, a rotor in said chamber, said rotor having a weight approximately equal to the weight of the water it displaces, whereby the rotor may be moved in the direction of flow of the fluid, said meter having inlet and outlet openings, the bottom of said rotor being constituted a valve and adapted to be operated to close one of said openings when it is attempted to make the direction of flow of the fluid through the meter the reverse of normal.

4. A rotary meter comprising a chambered casing, a movable measuring device in said casing, said measuring device having a weight approximately equal to the weight of the water it displaces, whereby said measuring device may be moved in the direction of flow of the fluid through the meter, bearings for said measuring device which permit said movement in addition to the measuring movement of the meter, said meter having inlet and outlet openings and a valve seat associated with the measuring device, said measuring device being adapted to engage said valve seat and to close one of said openings when it is attempted to make the direction of flow of the fluid through the meter the reverse of normal.

5. A meter comprising a one piece chambered body casing, a measuring chamber in said casing, a measuring device in said chamber, said casing body having a single opening in line with said chamber and through which the measuring device may be inserted and removed, and a sealing device for said opening, said sealing device comprising a sealing member threaded to the casing by bastard threads, and an interior normally inaccessible inclosed sealing mechanism between the sealing member and the casing.

6. A fluid meter comprising a body casing, a measuring device in said casing, said casing having inlet and outlet openings, and an additional opening in said casing through which access may be had to the interior, and a seal for said opening comprising a sealing member threaded to the casing by bastard threads, and an inclosed lock between said sealing member and the casing.

7. A fluid meter comprising a body casing, a measuring device in said casing, registering dials associated with said measuring device, walls forming a separate dial chamber in which the dials are located, and linings of moisture proof and moisture arresting materials combined and located between the chamber of the registering dials and the chamber of the measuring device and adapted to prevent the entrance of moisture to the chamber of the registering dials.

In testimony whereof I have hereunto set my hand in presence of two subscribing witnesses.

THOMAS CHARLTON.

Witnesses:
J. P. TARBOX,
H. A. ROBINETTE.